United States Patent
Yoshida et al.

(10) Patent No.: US 8,471,931 B2
(45) Date of Patent: Jun. 25, 2013

(54) VIDEO RECORDING SYSTEM

(75) Inventors: Daisuke Yoshida, Yokohama (JP); Yuichi Nonaka, Yokohama (JP)

(73) Assignee: Hitachi, Ltd., Chiyoda-Ku, Tokyo (JP)

( * ) Notice: Subject to any disclaimer, the term of this patent is extended or adjusted under 35 U.S.C. 154(b) by 482 days.

(21) Appl. No.: 12/770,505

(22) Filed: Apr. 29, 2010

(65) Prior Publication Data

US 2010/0329641 A1 Dec. 30, 2010

(30) Foreign Application Priority Data

Jun. 30, 2009 (JP) ................................ 2009-154539

(51) Int. Cl.
*H04N 5/217* (2006.01)
*H04N 5/228* (2006.01)

(52) U.S. Cl.
USPC ...................................... 348/241; 348/222.1

(58) Field of Classification Search
USPC ................. 348/193, 241, 470–471, 533, 535, 348/606, 608, 618, 622, 627, 683, 702, 271, 348/278, 317, 246, 243
See application file for complete search history.

(56) References Cited

U.S. PATENT DOCUMENTS 3,984,626 A * 10/1976 Mounts et al. ............. 348/400.1
5,404,179 A * 4/1995 Hamasaki ..................... 348/620
7,812,865 B2 * 10/2010 Tsuruoka ...................... 348/241

FOREIGN PATENT DOCUMENTS

JP         08-079571 A       3/1996

* cited by examiner

*Primary Examiner* — Chieh M Fan
*Assistant Examiner* — Ahmed A Berhan
(74) *Attorney, Agent, or Firm* — Kilpatrick Townsend & Stockton LLP

(57) ABSTRACT

A video camera comprises an optic system 101, an image pickup element 102, a de-mosaicing (de-tessellating) process portion 103, frequency converter portions 104-106, a frame memory 124, parameter produce portions 125-127, noise reduction process portions 107-109, a frame memory 110, frequency converter portions 111-113, noise reduction process portions 114-116, frequency inverter portions 117-119, a brightness signal produce portion 120, a color difference produce portion 121, a coding process portion 122 and a recording medium 123. With the above-mentioned structures, it is possible to execute noise extraction depending on the characteristics of an input video signal, and also to obtain an effect of improving high S/N, but without producing deterioration of the picture quality, i.e., removing the noises of the picked up video, effectively.

5 Claims, 11 Drawing Sheets

VIDEO RECORDING SYSTEM

This application relates to and claims priority from Japanese Patent Application No. 2009-154539 filed on Jun. 30, 2009, the entire disclosure of which is incorporated herein by reference.

BACKGROUND OF THE INVENTION

The present invention relates to a video recording system, for example, including an image pickup apparatus and an information processing apparatus therein.

As the background technology of the present technical field, there is already known the following Patent Document 1. In the Patent Document is disclosed the followings: "[Object] Within a noise removing or removing apparatus of a frame circulating type with applying an orthogonal transformation, obtaining a S/N improving effect much more than the congenital technology, without generating deterioration on the picture quality. [Structure] In a noise removing apparatus of a frame circulating method, a frame difference signal, after being dissolved into a plural number of spatial frequency components within a Hadamard transform circuit 105, they are treated with non-linear processing, respectively, within a non-linear processing circuit 106, and are composed within a Hadamard inverse-transformation circuit 107, to be converted into a signal on an original time axis. Also, with provision of a motion detector circuit 108 of using 2-dimensional low-frequency components among the Hadamard transformation components, a motion component is detected from the frame difference signal. In a coefficient circuit 109, a coefficient is controlled upon a result of detection of the motion detector circuit 108, and that coefficient is multiplied upon an output signal of the Hadamard inverse-transformation, thereby building up a noise component. This noise component is extracted from an input video signal. With such structures as mentioned above, it is possible to execute noise extraction depending on the characteristics of the input video signal, and thereby to obtain a high S/N improving effect" (see an abstract).

<Prior Art Documents>
<Patent Documents>

[Patent Document 1] Japanese Patent Laying-Open No. Hei 8-79571 (1996).

BRIEF SUMMARY OF THE INVENTION

In recent years, accompanying with high-speeding of a semiconductor device, micro-structuring of an image pickup element, and/or an development of the digital video processing technologies, a digital video recording system becomes common much more. This can be seen from the fact, for example, that a video camera for consumer use and/or a surveillance camera are/is close or familiar to us. Under such situation, a demand is increasing upon high quality of video. Though there are various viewpoints in the meanings of the high quality, but especially, it is an important problem, i.e., how to remove noises mixed in the video due to numerous factors.

Noises mixing into the video can be separated, roughly, into a random noise appearing on a screen at random, in relation to the position and the intensity thereof, a fixed pattern noise appearing, fixedly, on the screen, and a spike noise, which can be found sporadically, etc. Among of those, the random noise can be a reason of giving flickering and/or rough feeling on the video to a viewer, and it is a large factor of bringing about lowering of the picture quality. As a method for removing this random noise, in general is used a frame circulating type noise removing apparatus, with applying correlations of videos in a direction of time therein.

Further, as an improved version of the noise removing apparatus of this type, there is also already disclosed one, a noise removing apparatus combining with the Hadamard transformation; i.e., one (1) kind of the orthogonal transformation.

In the Patent Document 1, a noise component is extracted and is subtracted from the input signal, thereby enabling to remove the noise. Also, with detection of motion, it is possible to remove the noise at a ratio suitable for a portion having the motion and a portion standing still in the input signal.

Within the frame circulating type noise removing apparatus mentioned above and also such the improved type frame circulating type noise removing apparatus as is shown in the Patent Document 1, data of a previous frame is added to data of a present frame, and thereby enabling to remove the random noise therefrom; however, an afterimage, such as, a double image or an overlapping, still remains, in particular, at a position having movement or motion within a video. For removing such an ill effect, such a control is executed that discrimination is made between the position having motion and the position standing still within the video, and at the position having motion, the ratio of adding data to the previous frame (hereinafter, being called "a circulation coefficient") is reduced, to prevent the afterimage from generating, while increasing the circulation coefficient at the position having no motion. In that instance, although it is possible to increase a determining efficiency with provision of a measure for discriminating between the position having motion and the position standing still with using the Hadamard transformation, etc., as is shown in the Patent Document 1; however, no consideration is paid on an aspect that it is still difficult to determine the position having motion high accuracy, even with using the method petitioned above.

Also, in particular, in an image pickup system of digital video, it is necessary to conduct processing, with separating it into three (3) primary colors of lights (R (red), G (green), and B (blue)); however, there also no consideration is paid on an aspect that there is a possibility of generating a forged color that should not exist originally and/or a color noise, with processing R, G and B, separately.

Also, within the digital video pickup system for the consumer use, it is common to execute an edge enhancement process for adding a high-frequency component, which is lost through signal processing, after the process of removing the noise therefrom, and therefore it is a necessary to provide a circuit for that, separately; however, also no consideration is paid on an aspect that this brings about an increases of a processing load when implement it with software, or an increase of a circuit scale and/or an electric power consumption when implement it with hardware, such as, a LSI, etc.

For the purpose of dissolving or improving all or a part of the problems, which are mentioned previously, there is provided an invention as is described in the pending claims.

For example, with a video recording system, comprising: a converter unit for producing a frequency-converted signal by treating an orthogonal transformation on an input video signal; a correlation produce unit for obtaining a correlation between frames or fields of said frequency-converted signal; a filtering unit for executing a filter process on said input video signal; and a controller unit for controlling said filtering unit, wherein the filter process is executed on that input video signal depending on the correlation between that frequency conversion signal and that frame delay signal, and thereby achieving one (1) effect of executing the noise removal with discriminating a portion having motion at high accuracy.

Also, for example, with a video recording system, comprising: a converter unit for producing a frequency-converted signal by treating an orthogonal transformation on an input video signal; a correlation produce unit for obtaining a correlation between frames or fields of said frequency-converted signal; an inverse converter unit for treating an inverse conversion on said frequency-converted signal; a filtering unit for executing a filter process on an output of inverse converter unit; and a controller unit for controlling said filtering unit, wherein the filter process is executed on an output of that inverse converter means depending on the correlation between that frequency conversion signal and that frame delay signal, and thereby also achieving the similar effect to the above.

Also, for example, as a means for producing the input video signal to the image pickup system are provided an image pickup element for converting a light into an electric signal, an optic system for condensing the light on that image pickup element and forming an image, and a signal processing means, inputting the electric signal outputted from that image pickup element, so as to treat the signal process thereon, and thereby for outputting one or plural numbers of processing result (s), wherein said signal processing means is made up with a color signal producing means for producing three (3) color signals, red, green and blue, and thereby achieving an effect of executing the noise removal without the forged colors and/or color noises.

Also, for example, by making up the signal processing means with a means for producing the brightness signal and the color difference signal, or a means for producing only the brightness signal, there can be an effect of reducing the processing load and the circuit scale, together with discriminating the portion having motion at high accuracy.

Also, for example, by further providing a first parameter producing means for producing an intensity parameter for noise removal with inputting that correlation therein, a second parameter producing means for producing an intensity parameter for an enhance process while inputting that correlation therein, and also a non-linear processing means for executing a non-linear processing upon a second frequency conversion signal obtained by processing the orthogonal trans formation upon the original input video signal, and/or a second frequency conversion signal obtained by processing the orthogonal transformation upon the inverse conversion signal, again, it is possible to execute the noise reduction process and the enhance process depending on the spatial frequency within said non-linear processing means, and thereby achieving an effect of executing the noise removal and the edge enhancement process, but without increasing the processing load and the circuit scale.

With the present invention mentioned above, discrimination can be made between the portion having motion and the portion standing still, with high accuracy, for example, and therefore there can be obtained an effect of enabling removal of the random noise with using the circulation coefficient depending on the video characteristics.

Also, there can be obtained an effect of an effect of enabling removal of the random noise, without generating the forged color and/or the color noise, for example.

Also, there can be obtained an effect of reducing the processing load and/or the circuit scale, and reduction of electric power.

Objects, structures and effects other than those mentioned above will be apparent form the explanation of the preferred embodiments, which will be given hereinafter.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings.

[Embodiment 1]

Figure 1:
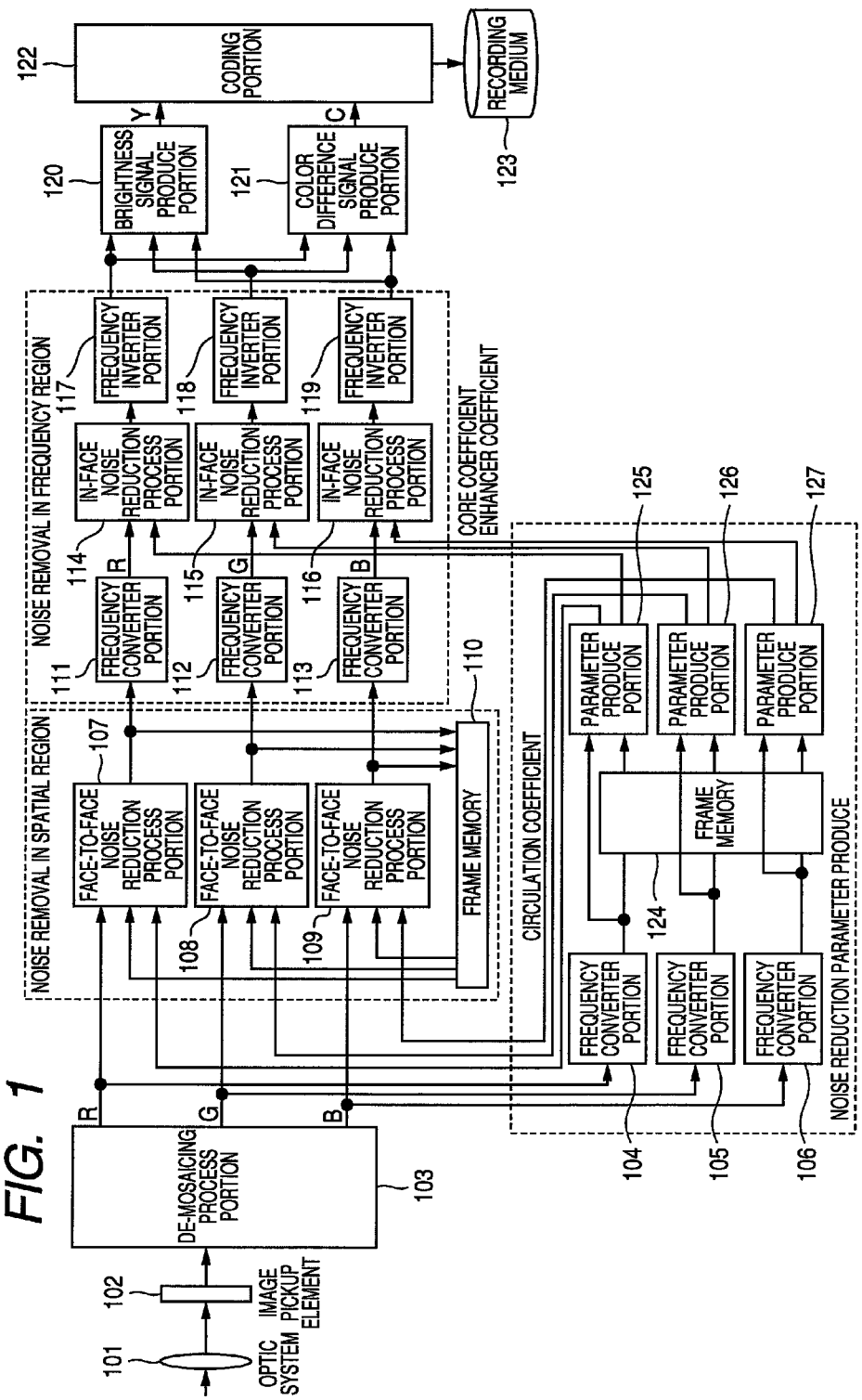
FIG. 1 is a block diagram for showing a first embodiment, according to of the present invention.

A first embodiment according to the present invention will be shown in FIG. 1. This FIG. 1 shows the image pickup apparatus, according to the present invention, which is accomplished in the form of a video camera. The video camera, according to the present embodiment, comprises a optic system 101, an image pickup element 102, a de-mosaicing (de-tessellating) process portion 103, frequency converter portions 104-106, noise reduction process portions 107-109, a frame memory 110, frequency converter portions 111-113, noise reduction process portions 114-116, frequency inverter (or, an inverse converter) portions 117-119, a brightness signal generator portion 120, a color difference signal generator portion 121, a coding portion 122 and a recording medium 123. Hereinafter, explanation will be given on the operation of the video camera according to the present embodiment, following one by one, sequentially.

Lights emitting from an object not shown in the figure are firstly condensed by means of the optic system 101. Though not illustrating the details relating to the optic system 101, it is built up with a plural number of lenses, a motor for moving the lens(es) for focusing and adjusting a magnification power thereof, and a controller system for controlling this, etc.

The lights condensed through the optic system 101 are converted into electric signals by the image pickup element 102. The image pickup element 102 is built up with, other than an image pickup portion, such as, a CCD or a CMOS, which actually senses the lights, an AD converter circuit for sampling an analog electric signal so as to convert into a digital electric signal, an AGC circuit for adjusting a gain depending on quantity of lights in the circumference thereof, a timing generator for supplying a timing signal to the image pickup element, for the purpose of driving thereof, and a controller circuit for controlling those mentioned above, etc.

A video signal, which is converted into the digital electric signal by the image pickup element 102 is processed in the de-mosaicing (de-tessellating) process portion 103, i.e., R-component, G-component and B-component signals are outputted therefrom. For example, in case where the image pickup portion 102 applied in the image pickup element is an image sensor of a Bayer array-type, for example, the R-component, G-component and B-component signals are not always completed at every sampling position. In such case, the de-mosaicing (de-tessellating) process portion 103 generates a signal component in short at a sampling position from pixels in the periphery thereof, through an appropriate process, such as, a pixel interpolation or the like, for example, thereby to output it. However, depending on a kind of the image pickup portion to be applied, sometimes, all the R-component, G-component and B-component signals are completed at the time when they are outputted from the image pickup portion 102. In such case, no such de-mosaicing process portion 103 may be provided.

The signals of the respective color components, which are outputted from the de-mosaicing (de-tessellating) process portion 103 are inputted, respectively, into the separate frequency converter portions 104 to 116, and for each unit of the pixel (for example, 4 pixels×4 pixels, 8 pixels×8 pixels, etc.) is executed the frequency conversion. As the frequency conversion may be applied, for example, a Discrete Cosine Transform (DCT), a Hadamard transformation, or a Wavelet transformation, etc.

The signals of the respective color components, which are converted on the frequency within the frequency converter portions 104 to 106, are stored in the frame memory 124, and are read out after being treated with a frame delay (or, a field delay is also applicable). The frame memory 124 may be in common with a frame memory, physically, which will be mentioned later, or it may be another recoding memory.

The signals of the respective color components, the frequencies of which are converted within the frequency converter portions 104 to 106, are stored in the frame memory 124, and the signals of the respective color components, which are read out from the frame memory after being treaded with the frame delay or retardation, are inputted into the parameter produce portions 125 to 127, respectively. In those parameter produce portions 125 to 127 are produced parameters in relation to noise removal within a spatial region on the latter stage thereof, from the correlation between the signals being converted the frequency thereof, and the signals obtained by delaying them, and are supplied to the face-to-face noise reduction process portions 107 to 109. Also, parameters in relation to the noise removal in a frequency region, and are supplied to the in-face noise reduction process portions 114 to 116.

Within the face-to-face noise reduction process portions 107 to 109, face-to-face noise removal of frame circulation type is conducted, with using video data of the spatial region. Detailed contents of the noise removal process will be mentioned, later.

The respective color component signals, each being processed with the noise reduction process, are stored into the frame memory 110, and in parallel with this, they are also supplied to the frequency converter portions 111 to 113. Within the frequency converter portions 111 to 113, the frequency conversion is treated with, for each pixel unit predetermined. Explaining in more details thereof, upon each color component signal is treated the frequency conversion (such as, DCT, DFT, Hadamard transformation, etc.), for example, by a unit of circumferential pixels (for example, 5×5 pixels, 7×7 pixels, etc.), including a target pixel therein. Herein, the frequency conversion to be treated within the frequency converter portions 111 to 113 can be controlled, finely, by a unit of frequency, with calculating by a unit as large as possible, and also finely dissolving the frequency, thereby improving the picture quality. On the other hand, since the circuit scale is increased if the unit of calculation becomes large, then within the frequency converter portions 104 to 106 mentioned previously, it is possible to reduce the circuit scale and the electric power, by refining the calculation to be minimal but necessary; e.g., executing the frequency conversion by a simple calculation (for example, the Hadamard transformation, etc.), or reducing units of calculations (for example, calculation of a unit of 3×3 pixels and so on). Of course, it does not matter if the calculations within the frequency converter portions 111 to 113 are same to the processing contents within the frequency converter portions 104 to 106.

The color component signals, which are converted in the frequency converter portions 111 to 113, are supplied into in-face noise reduction process portions 114 to 116, each of which is prepared for each color component. In those in-face noise reduction process portions 114 to 116 are executed the noise reduction process and the enhance process, within the frequency region. Detailed contents of the noise reduction process and the enhance process will be mentioned, later.

The color component signals, after being treated with the noise reduction process thereon, are supplied into the frequency inverter portions 117 to 119. Herein, a calculation is executed, reversing to the frequency conversion process, which is treated within the frequency converter portions 111 to 113, and thereby restoring the color component signals converted into the frequency region back to the signals of the original spatial region.

Each color component signal, which is restored into the spatial region, is supplied to the brightness signal generator portion 120, and the color difference signal generator portion 121. In the brightness signal generator portion 120 is treated a calculation method, such as, a matrix calculation, etc., upon each color component signal supplied thereto; thereby producing a brightness signal. In the color difference signal generator portion 121, also a color difference signal is produced, in the similar manner thereto.

The brightness signal and the color difference signal, which are produced, are supplied into the coding portion 122. In the coding portion 122 is treated a compression coding process, such as, H.264 or MPEG-2, etc., for example, upon the brightness signal and the color difference signal inputted. And, there is also executed a multiplexing process upon a compressed audio signal, which is produced by an audio collector portion, an audio signal pre-process portion and an audio signal coding portion, though not shown in the figure, and a compressed video signal, which is produced within the compression coding process portion mentioned above, thereby to be recorded on the recording medium 123 as compressed video/audio data.

Processing in the parameter produce portions 125 to 127 and the noise reduction process portions 107 to 109 will be explained by referring to FIG. 2. Although mentioning will be made on the details of the processing within the parameter produce portion 125 and the noise reduction process portion 107, as an example thereof, but the processing is also same within the parameter produce portions 126 and 127 and the noise reduction process portions 108 and 109.

Figure 2:
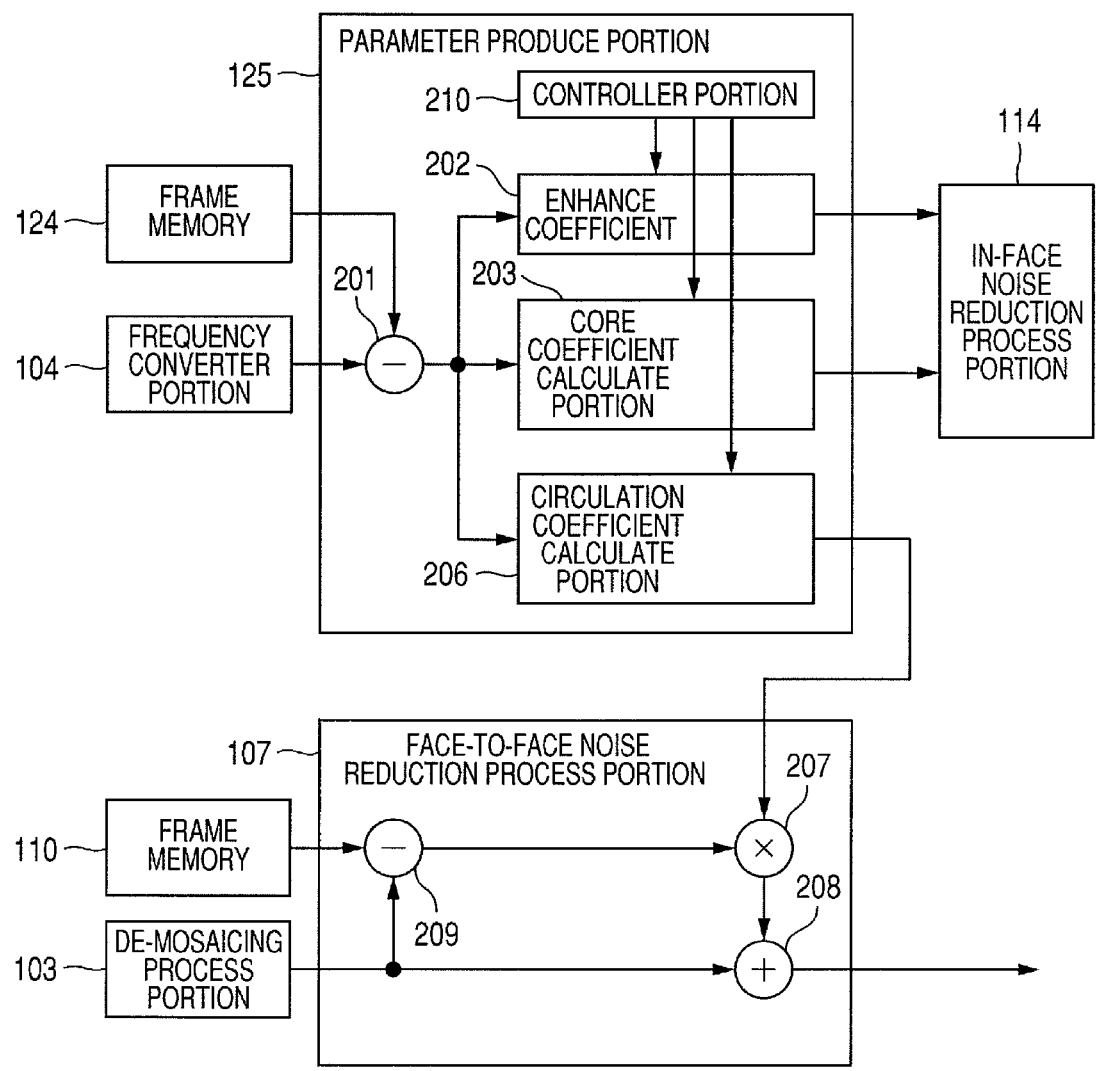
FIG. 2 is a view for showing the processing in a parameter produce portion 125 and a noise reduction process portion 107.

FIG. 2 is the structural view for showing the details of the parameter produce portion 125 and the noise reduction process portion 107. The parameter produce portion 125 is constructed with, having a subtractor 201, an enhance coefficient calculator portion 202, a core coefficient calculator portion 203, a circulation coefficient calculator portion 206, and a controller portion 210.

In FIG. 2, the frame memory 124, the frequency converter portion 104, the in-face noise reduction process portion 114, the frame memory 110 and the de-mosaicing (de-tessellating) process portion 103 are same to the constituent elements or components shown in FIG. 1, wherein the R-component signal inputted from the frequency converter portion 104, firstly within the subtractor 201, is treated with the subtraction process between the R-component signal, which is stored in the frame memory 124 and delayed by one (I) frame. And, the difference signal produced is supplied to the enhance coefficient calculator portion 202, and to the core coefficient calculator portion 203, wherein are conducted a coring process necessary for the noise removal process within the frequency region, which will be mentioned later, and the calculation of parameters necessary for the enhance process. The parameters calculated herein may be determined, separately, for each frequency.

At the same time, the difference signal is also supplied to the circulation coefficient calculator portion 206, wherein is conducted the calculation of the circulation coefficient necessary for a noise removal process within the spatial region, which will be mentioned later. The circulating coefficient calculator portion 206 produces a circulating coefficient, in particular, depending on an absolute value of a low-frequency component of the result of the subtraction process, for example.

The controller portion 210 controls operations of the enhance coefficient calculator portion 202, the core coefficient calculator portion 203 and the circulating coefficient calculator portion 206 mentioned above, upon basis of the difference signals, setups made by a user obtained through a user interface not shown in the figure, and characteristics of the input signals (for example, a histogram, an in-face brightness distribution, an edge information, and so on).

Also, in FIG. 2, the face-to-face noise reduction process portion 107 is built up with, having a multiplier 207, an adder 208 and a subtractor 209. The R-component signal inputted from the de-mosaicing process portion 103 is, firstly, treated with the subtraction process in the subtractor 209, between the R-component signal, which is stored in the frame memory 110 and is delayed by one (1) frame. The circulation coefficient, which is produced within the circulation coefficient producing portion 206, is multiplied on a result of the subtraction process by the multiplier 207, and thereafter it is added to the R-component signal, which is inputted from the de-mosaicing process portion 103. Random noises on a still picture are distributed, equally, all over the frequency components, and they have no correlation between the frames, and therefore it is possible to reduce the random noises according to the present process. Also, with treating the frequency conversion, it is possible to detect an edge portion of a moving object, for example, much more sensitively; therefore it is possible to discriminate between the moving portion and the standing still portion, with much accuracy much higher than that of the conventional art.

Figure 3:
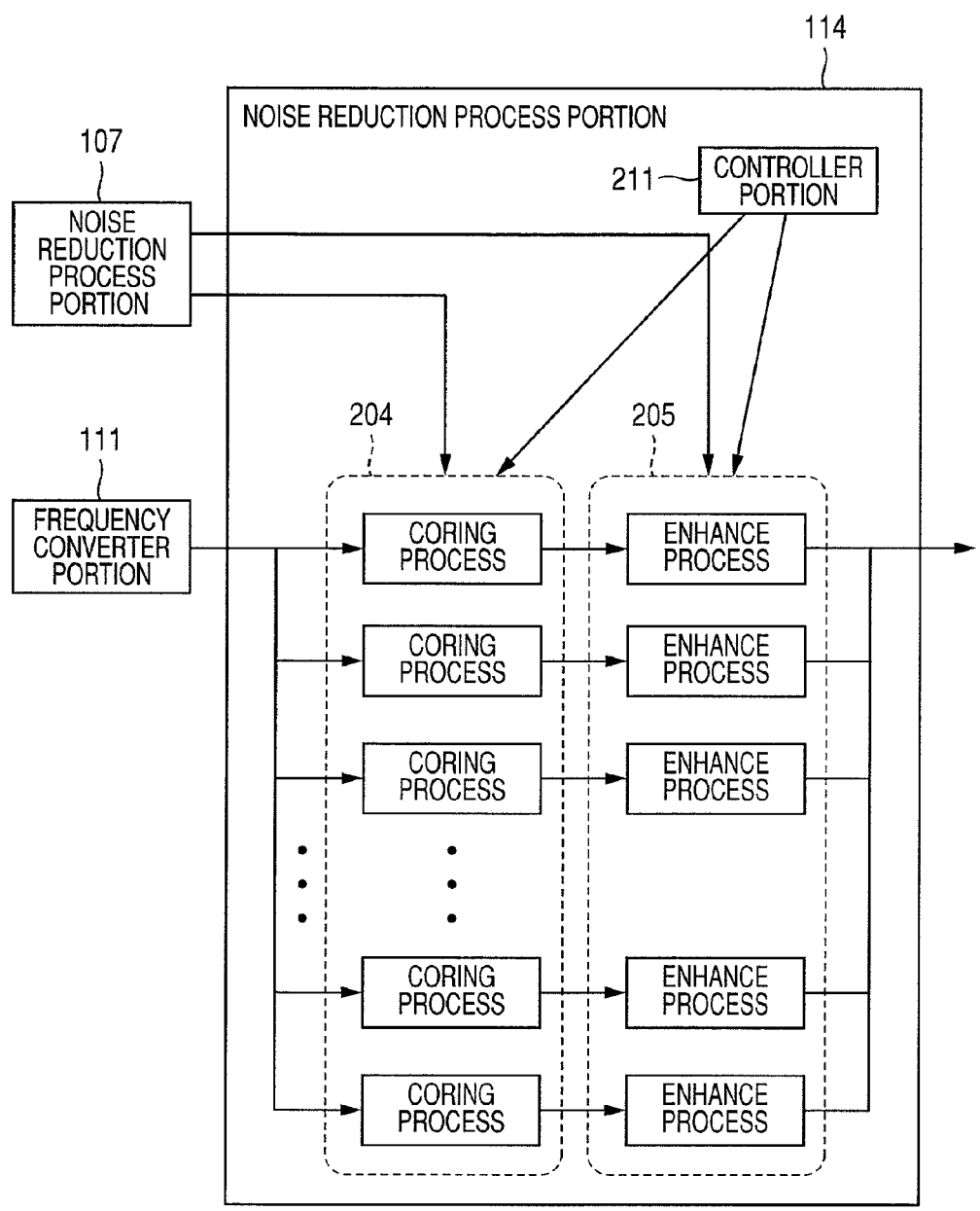
FIG. 3 is a view for showing the processing in a noise reduction process portion 114.

Following to the above, explanation will be made on the processing within the noise reduction process portions 114 to 116, by referring to FIG. 3. In FIG. 3, the noise reduction process portion 107, the frequency converter portion 111 and the noise reduction process portion 114 are as same as shown in FIG. 1, and in particular, is shown the details of the structures of the noise reduction process portion 114 therein. As an example, mentioning will be made on the details of the processing within the noise reduction process portion 114; however, the inside structure and the operation are also same within the noise reduction process portions 115 (see FIG. 1) and 116 (see FIG. 1).

In FIG. 3, the noise reduction process portion 114 is constructed with having a coring process group 204 and an enhance process group 205, and a controller portion 211. The coring process group 204 is constructed with a plural number of coring processes. The coring process is conducted on each frequency component, separately.

Figure 4:
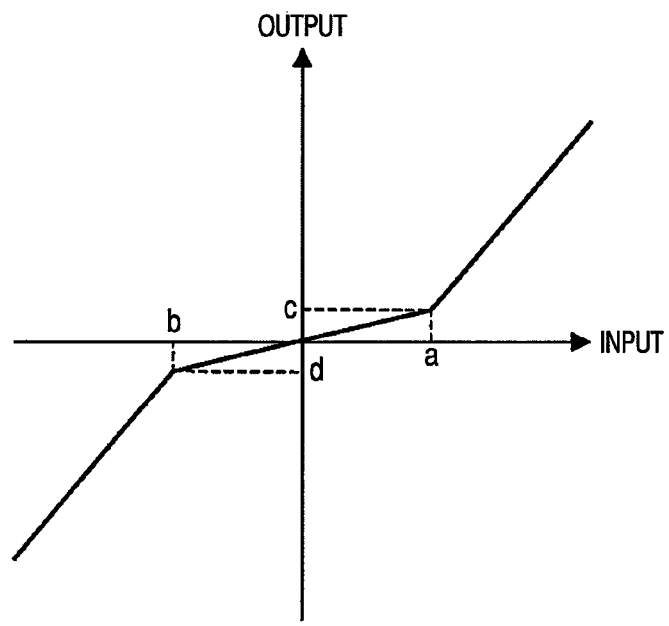
FIG. 4 is a graph for showing input/output characteristics of a coring process portion.

The relationship between an input and an output in the coring process is shown in FIG. 4. In the coring process portion, a mapping is executed from an input signal to an output signal, for example, upon basis of four (4) pieces of parameters, which will be mentioned below. Thus, the following four (4) parameters: (1) an influence region on a positive side of coring (a point "a" in FIG. 4); (2) an influence region on a negative side of coring (a point "b" in FIG. 4); (3) an inclination of the coring on the positive side ("c/a" in FIG. 4); and (4) an inclination of the coring on the negative side ("d/b" in FIG. 4).

With conducting the frequency conversion on the input video, it is possible to separate the high-frequency component (i.e., the random noise components, and the edge components of the object) from the low-frequency component (i.e., a portion not defining an edge of the object or the like). With the video signal after this frequency conversion, by obtaining a difference between the frames thereof, it is possible to separate or divide the random noises from the motion or movement component of the object, effectively.

The above-mentioned parameters ("a" to "d" in the present example) are controlled with an aid of the controller portion 211 (shown in FIG. 3). Explanation will be made on a method for determining the parameters. First of all, the influence region of coring (a, c) can be determined depending on a noise level, for example. As characteristics of the random noises can be listed up the following facts; i.e., that they have a predetermined distribution within a certain level (e.g., a uniform distribution or a Gauss distribution), that the level itself is relatively low, and that they are included equally within all the frequency components. For this reason, an investigation is made upon levels of the noises included in the input video, in advance, so as to determine "a" and "c" depending on it. Also, depending on the characteristics mentioned above, normally, "a" and "c" are determined to be "c=−a". Regarding the noise level, it can be investigated up to a certain degree, by determining an environment (e.g., temperature, illuminance, etc.) where the video camera according to the present embodiment should be used, in advance, and upon basis of this, the parameters can be determined within the controller portion 211. Also, building up the controller portion 211 with a CUP, and installing the control in the form of software, it is also possible to make a fine adjustment of those parameters depending on change of the illuminance and/or characteristic quantity of the video.

A degree of noise removal is determined by the inclination (i.e., "c/a", "d/b") in the coring region. Thus, the inclination comes to be small (i.e., close to the horizontal), the effect of noise removal comes to be large. Also, though the parameters of coring can be determined, separately, for each frequency component, in the structure, according to the present invention; however, since the random noise components have a tendency of appearing for each frequency component, equally, therefore it is common to determine the influence regions of coring and the inclinations of coring regions in the similar manner, in all of the frequency components.

With treating the coring process as was mentioned above, it is possible to suppress the random noises, suppressing the random noise components while outputting the low-frequency component and the high-frequency component having a large level (i.e., the edge component of the object) as they are; therefore, it is possible to suppress the random noises without generating blur or fuzz on the video.

Figure 5:
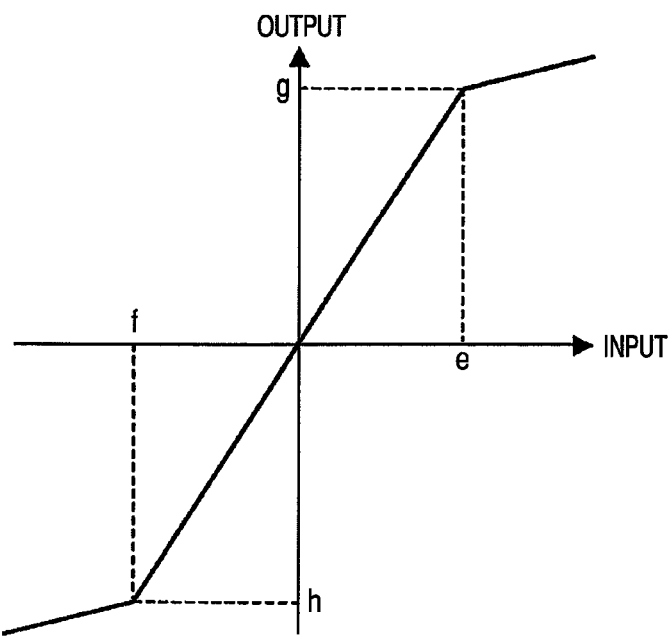
FIG. 5 is a graph for showing input/output characteristics of an enhance process portion.

The video signal, the random noise components of which are reduced within the coring process group 204 (see FIG. 3), is inputted into the enhance process group 205 (see FIG. 3), following to the above. The enhance process can be also executed in the similar manner to that of the coring process, separately, for each frequency component. The relationship between an input and an output in the enhance process is shown in FIG. 5. The parameters in the enhance process are determined as follows, for example. Thus, the following four (4) parameters: (1) an influence region on a positive side of enhancing (a point "e" in FIG. 5); (2) an influence region on a negative side of enhancing (a point "f" in FIG. 5); (3) an inclination of the enhancing on the positive side("g/e" in FIG. 5); and (4) an inclination of the enhancing on the negative side ("h/f" in FIG. 5).

By calculating and determining those for each frequency component, it is possible to enhance a specific frequency component(s), though being difficult with the conventional filtering, and thereby building up a fine appearance of the video. In general, it is possible to finish up the video easy to see, clearly showing an outlining, by strongly executing the enhance process upon a middle-frequency component, without losing naturalness of the video by determining the inclination of enhance to be small for the low-frequency component. Since it generates a case of giving visually ill influences, such as, roughness on the video, if strengthening the high-frequency component too much, therefore it is preferable to set the enhance process to be moderate.

As was explained heretofore, with execution of the coring process and the enhance process on each frequency component, separating distinctively, it is possible to remove the random noises at extremely high accuracy.

Figure 6:
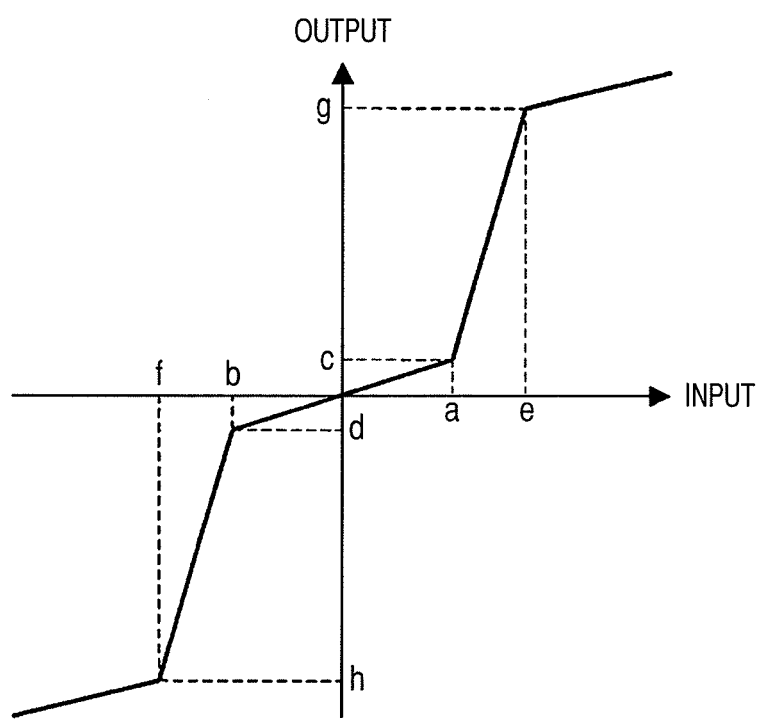
FIG. 6 is a graph for showing an example of input/output characteristics having the both characteristics of the coring process portion and the enhance process portion.

Also, as an input/output characteristic, having both characteristics of the coring process and the enhance process in common, there is one as shown in FIG. 6. It is possible to execute both the processes, simultaneously, by one (1) piece of filtering calculation, with controlling a boundary point between the coring process and the enhance process and an inclination of each portion (a parameter), as the parameters, within the controller portion 211 from the user, or automatically controlling them depending on an environment of use and/or characteristics of the video. For this reason, it is possible to achieve shortening of the processing time with the software processing, while scaling down the circuit scale and reduction of the electric power with the hardware processing.

[Embodiment 2]

Figure 7:
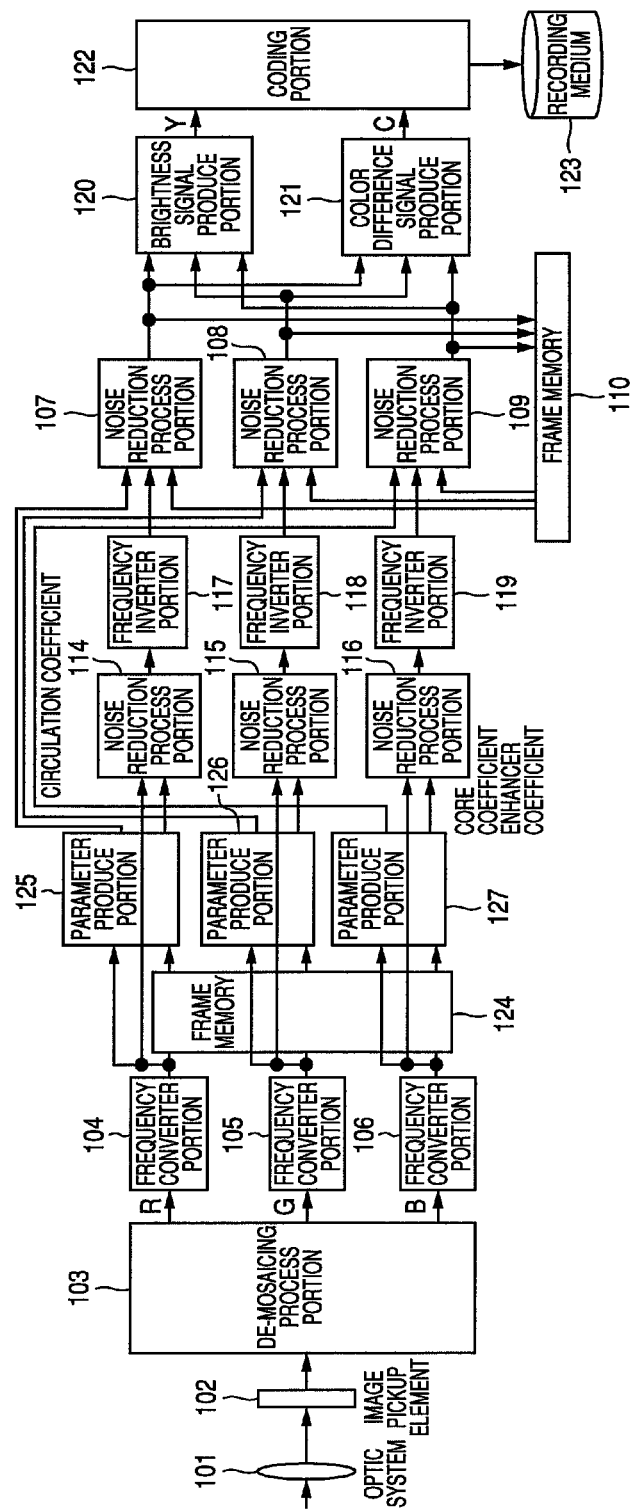
FIG. 7 is a block diagram for showing a second embodiment, according to of the present invention.

A second embodiment according to the present invention will be shown in FIG. 7. This FIG. 7 shows the image pickup apparatus, according to the present invention, which is accomplished in the form of the video camera. The video camera, according to the present embodiment, comprises the optic system 101, the image pickup element 102, the de-mosaicing (de-tessellating) process portion 103, the frequency converter portions 104-106, the frame memory 124, the parameter produce portions 125-127, the noise reduction process portions 114-116, the frequency inverter (or, the inverse converter) portions 117-119, the noise reduction process portions 107-109, the frame memory 110, the brightness signal generator portion 120, the color difference signal generator portion 121, the coding portion 122 and a recording medium 123. Each constituent element or component shown in FIG. 7, being attached with the same reference numeral to that shown in FIG. 1, operates in the similar manner. Hereinafter, explanation will be given on the operation of the video camera according to the present embodiment, following one by one, sequentially.

Since the second embodiment, according to the present invention, is almost common with the first embodiment mentioned above, then detailed explanation will be only upon the difference between them. Firstly, the video signal, which is taken into by the optic system 101 and the image pickup element 102, is processed within the de-mosaicing process portion 103 to be divided into each of the color component signals, and they are inputted into the frequency converter portions 104 to 106, to be frequency converted, respectively. Thereafter, the respective color component signals, the frequencies of which are converted, and also the respective color component signals, which are obtained by frame delaying them within the frame memory 124, are supplied into the parameter produce portions 125 to 127; thereby producing parameters for adjusting a degree of noise reduction processes in the later stage. Also, the respective color component signals, the frequencies of which are converted within the frequency converter portions 104 to 106, are also supplied to the noise reduction process portions 114 to 116. Because those noise reduction process portions 114 to 116 are same in structures and the process contents, explanation thereof will be omitted herein. Upon the respective color component signals, on which non-linear type processes (e.g., the coring process and the enhance process) are treated within the noise reduction process portions 114 to 116, are executed inverse calculations within the frequency inverter portions 117 to 119, and thereby they are converted into signals of the spatial region, again.

The respective color component signals, which are converted again, are supplied into the noise reduction process portions 107 to 109 provided for each color. Those noise reduction process portions have such structures that also are supplied thereto the color component signals of past frames, which are already stored in the frame memory 110. Within the noise reduction process portions 107 to 109 are treated the noise reduction process in the time region. With the detailed contents of the noise reduction process, they are similar to those of the first embodiment, and therefore the explanation thereof will be cut off herein.

The signals treated with the noise reduction process thereon are written into the frame memory 110 and are also supplied into the brightness signal generator portion 120 and the color difference signal generator portion 121 to be converted to the brightness signal and the color difference signal. The brightness signal and the color difference signal are compressed and coded in the coding portion 122, and are also executed a multiplexing process upon a compressed audio signal, which is produced by an audio collector portion, an audio signal pre-process portion and an audio signal coding portion, though not shown in the figure, and a compressed video signal, which is produced within the compression coding process portion mentioned above, thereby to be recorded on the recording medium 123 as compressed video/audio data.

With applying the present structure, comparing to the first embodiment, there can be obtained an effect of reducing a number of the frequency converter portions, and reduction of the processing volume, reduction of the circuit scale, and reduction of electric power consumption, while executing the noise removal for the input signal.

Figure 8:
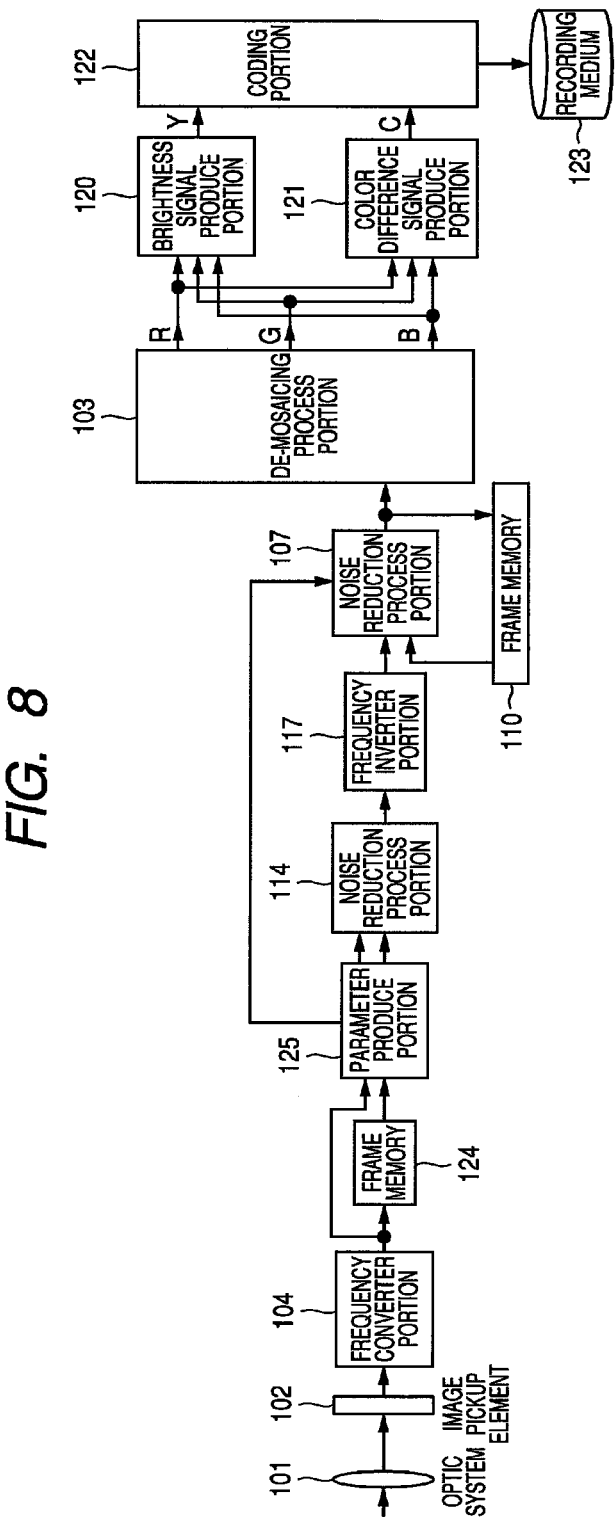
FIG. 8 is a block diagram for showing a variation, according to the second embodiment of the present invention.

A variation of the present embodiment will be explained by referring to FIG. 8. This FIG. 8 shows the image pickup apparatus, according to the present invention, which is accomplished in the form of the video camera. Each constituent element or component shown in FIG. 8, being attached with the same reference numeral to that shown in FIG. 1, operates in the similar manner. The video camera, according to the present embodiment, comprises the optic system 101, an image pickup element 102, the image pickup element 102, the frequency converter portion 104, the frame memory 124, the parameter produce portion 125, the noise reduction process portion 114, the frequency inverter (or, the inverse converter) portion 117, the noise reduction process portion 107, the frame memory 110, the de-mosaicing (de-tessellating) process portion 103, the brightness signal generator portion 120, the color difference signal generator portion 121, the coding portion 122 and a recording medium 123. Hereinafter, explanation will be given on the operation of the video camera according to the present embodiment, following one by one, sequentially.

A video signal produced by the optic system 101 and the image pickup element 102 is inputted into the frequency converter portion 104, mixing up with R, G and B colors. Within the frequency converter portion 104 is treated the frequency conversion in the similar manner in the embodiment 1, but in this instance, the frequency conversion is treated with using values of the pixels of the same color in periphery thereof. For example, in case where applying the image pickup element of a Bayer array, a first line has an array, such as, R-component, G-component, R-component, G-component . . . , for example, and on a second line has an array, G-component, B-component, G-component, B-component . . . , for example. A third line has an array same to the array of the first line. Accordingly, when treating the frequency conversion on the R-component, for example, it is presumed that the frequency conversion is treated with using a R-component pixel locating at a center and R-component pixels surrounding that pixel (i.e., neighboring pixels in horizontal/vertical directions, and pixels separating from by three (3)). With a G-component and a B-component, the frequency conversion is treated in the similar manner.

The video signal, the frequency of which is converted, is treated with the noise reduction process and the enhance process within the noise reduction process portion 114, and it is inversely converted within the frequency inverter portion 117, to be restored into the signal of the spatial region.

The restored signal is treated with the noise-removal process in the spatial region within the noise reduction process portion 107, and thereafter, it is separated into the R-component, the G-component and the B-component, to be converted into the brightness signal and the color difference signal within the brightness signal generator portion 120 and the color difference signal generator portion 121. Thereafter, the compression coding and the multiplexing are executed within the coding portion 122, to be recorded on the recording medium as data.

With applying the embodiment according to the present invention therein, it is possible to reduce the scale of the circuits, which are necessary for the frequency conversion, the noise removal, the inverse frequency conversion, while achieving the noise removal and the enhance same to those in the embodiment 1.

Figure 9:
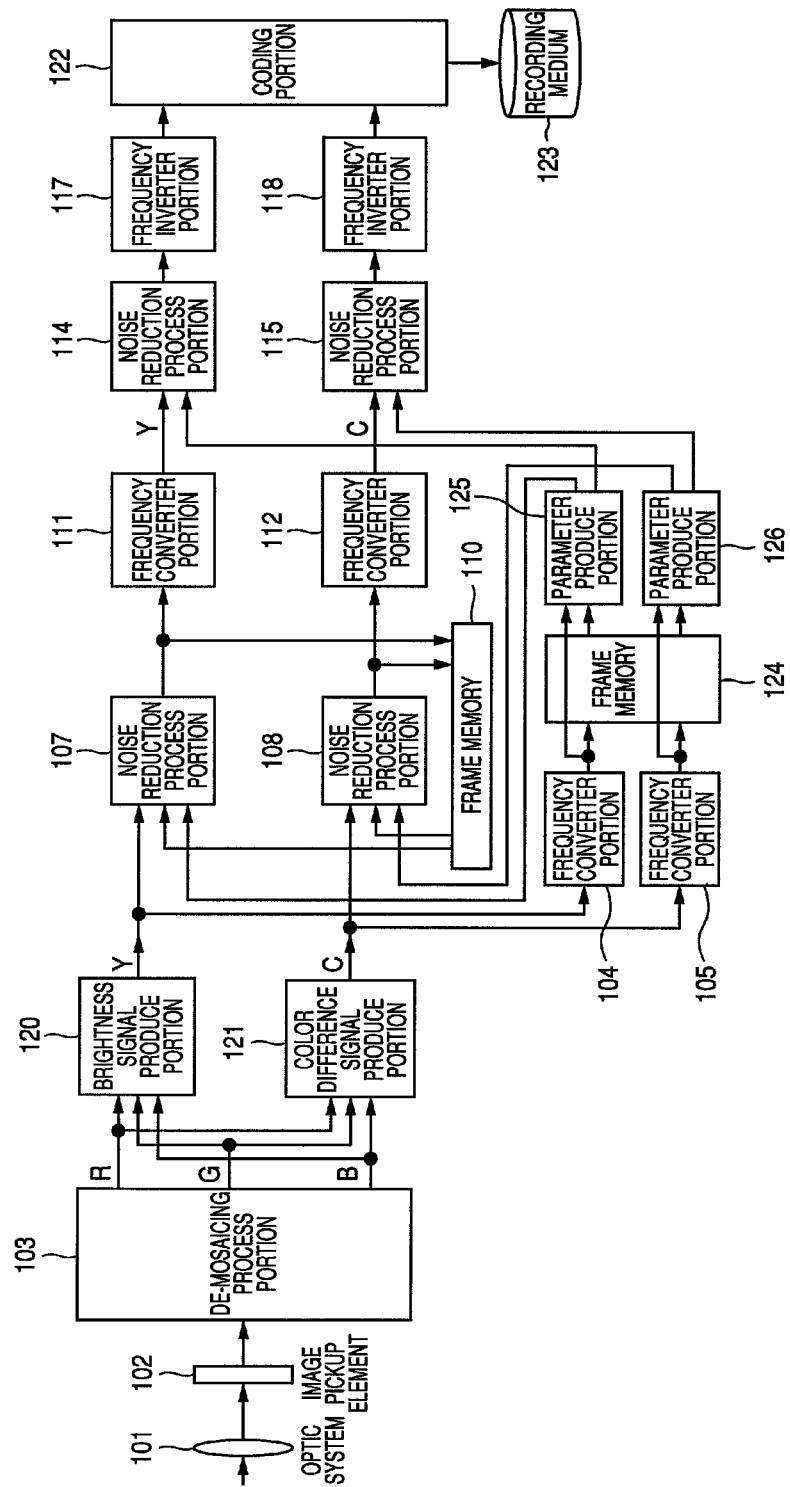
FIG. 9 is a block diagram for showing a further variation, according to the second embodiment of the present invention.

Also, other variation of the present embodiment will be shown in FIG. 9. This FIG. 9 shows the image pickup apparatus, according to the present invention, which is accomplished in the form of the video camera. Each constituent element or component shown in FIG. 9, being attached with the same reference numeral to that shown in FIG. 1, operates in the similar manner. The video camera, according to the present embodiment, comprises the optic system 101, an image pickup element 102, the de-mosaicing (de-tessellating) process portion 103, the brightness signal generator portion 120, the color difference signal generator portion 121, the frequency converter portions 104 and 105, the frame memory 124, the parameter produce portions 125 and 126, the noise reduction process portions 107 and 108, the frame memory 110, the frequency converter portions 111 and 112, the noise reduction process portions 114 and 115, the frequency inverter (or, the inverse converter) portions 117 and 118, the coding portion 122 and a recording medium 123. Hereinafter, explanation will be given on the operation of the video camera according to the present embodiment, following one by one, sequentially.

Herein, since there are many common aspects with the first embodiment, the explanation will be limited only to a brief one, and since the detailed operations of each portion are same to those of the first embodiment, therefore they will be cut off herein. First of all, the video signal, which is taken into within the optic system 101 and the image pickup element 102, is separated into the R-component, the G-component and the B-component within the de-mosaicing (de-tessellating) process portion 103, and they are converted into the brightness signal and the color difference signal within the brightness signal generator portion 120 and the color difference signal generator portion 121. The brightness signal and the color difference, both produced, are inputted into the frequency converter portions 104 and 105, to be treated with the frequency conversion thereupon. Upon basis of the outputs thereof, and also the signals obtained by frame-delaying those within the frame memory 124, there are produced parameters to be used for the noise removal within the parameter produce portions 125 and 126. Thereafter, the noise-removal process is treated upon the brightness signal and the color difference signal within the noise reduction process portions 107 and 108, and they are supplied into the frequency converter portions 111 and 112. The brightness signal and the color difference signal, the frequencies of which are converted, are supplied into the noise reduction process portions 114 and 115, and after being treated with the noise-removal process and the enhance process thereon, they are restored within the frequency inverter portions 117 and 118. The brightness signal and the color difference signal, being treated with the noise removal thereon, are executed with the compression coding and the multiplexing within the coding portion 122, and are recorded on the recoding medium as data.

With applying the embodiment according to the present invention therein, it is possible to suppress generation of the forged colors and the color noises, which may generate due to processing the R, G and B, separately, while achieving the noise removal and the enhance similar to those in the embodiment 1.

Figure 11:
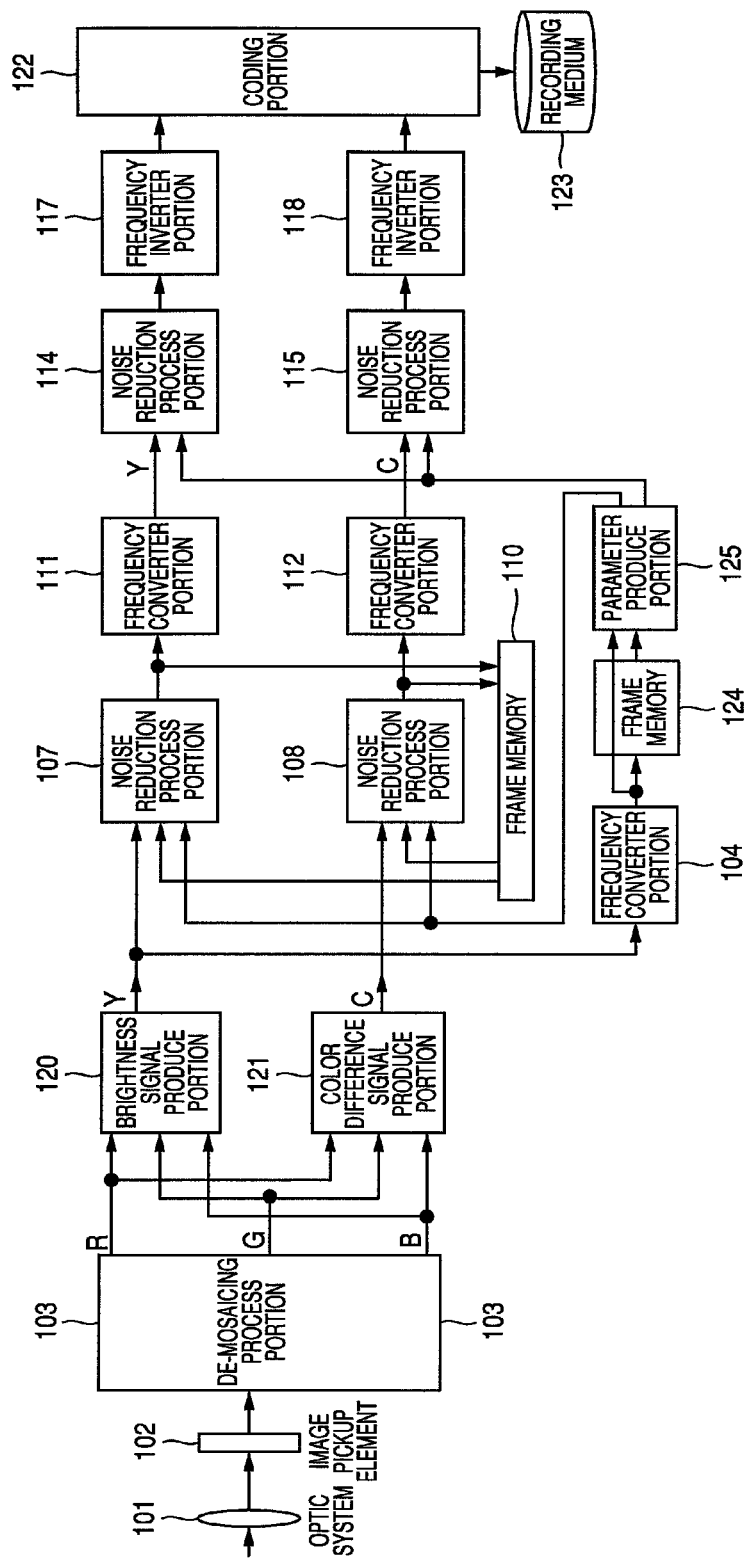
FIG. 11 is a block diagram for showing a variation, according to the third embodiment of the present invention.

As a development of the embodiment mentioned above, it is also possible to apply such the structure that, the parameters for the noise removal are produced from only the brightness signal, so as to use the parameters produced for the noise-removal process and the enhance process of both the brightness signal and the color difference signal. This embodiment will be shown in FIG. 11. Mentioning will be made only on the difference between those shown in FIG. 11 and FIG. 9. This FIG. 11 shows the structures obtained by removing the frequency converter portion 105 and the parameter produce portion 126 from those shown in FIG. 9, and also, both the parameters for the noise removal to be used in the noise reduction process portion 108, and also the parameters for the noise removal to be used in the noise reduction process portion 115 are produced within the parameter produce portion 125. With applying such the structures, it is possible to remove the frequency conversion process portions on side of the color difference signal, and this results into reduction of the processing volume/circuit scale/electric power consumption.

Figure 12:
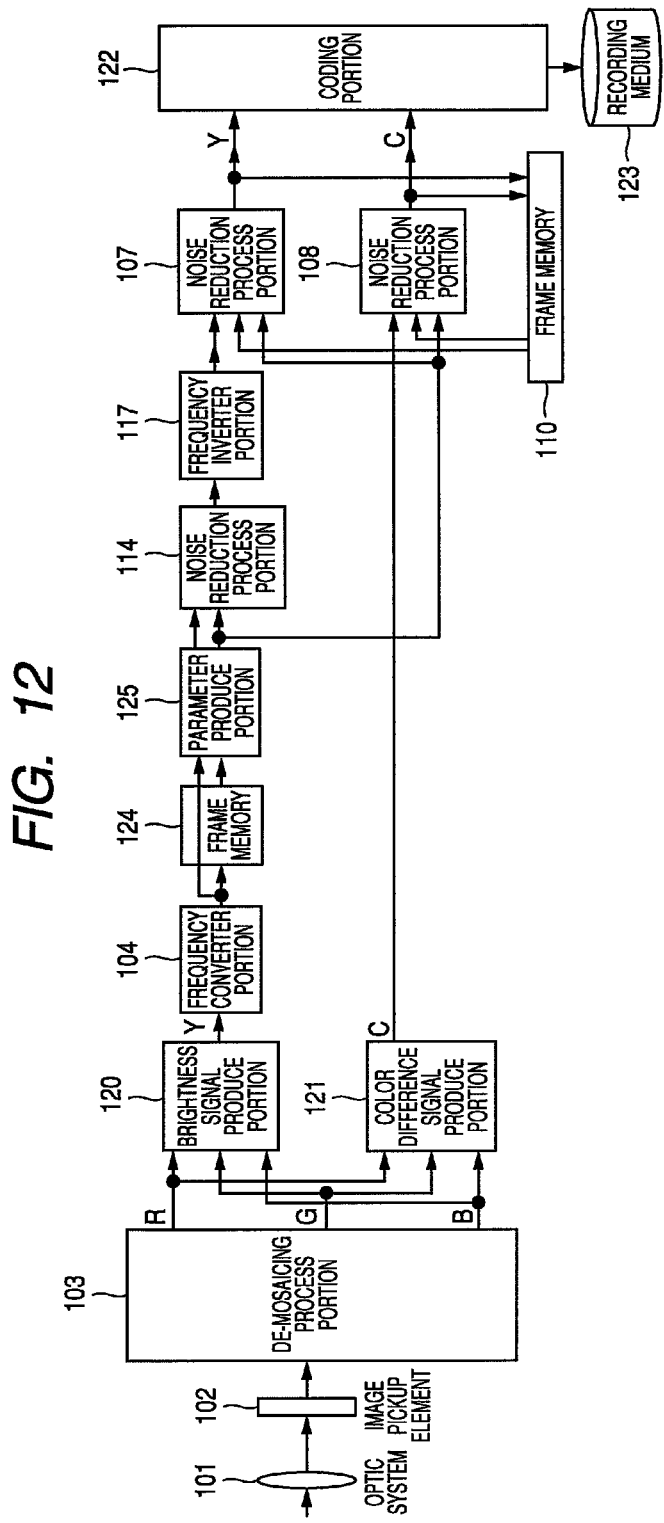
FIG. 12 is a block diagram for showing a further variation, according to the third embodiment of the present invention.

Further, as other development of the embodiment mentioned above, an embodiment shown in FIG. 12 is also possible. Each constituent element or component shown in FIG. 12, being attached with the same reference numeral to that shown in FIG. 1, operates in the similar manner. The present development comprises the optic system 101, an image pickup element 102, the de-mosaicing (de-tessellating) process portion 103, the brightness signal generator portion 120, the color difference signal generator portion 121, the frequency converter portion 104, the frame memory 124, the parameter produce portion 125, the noise reduction process portion 114, the frequency inverter (or, the inverse converter) portion 117, the frame memory 110, the noise reduction process portions 107 and 108, the coding portion 122 and a recording medium 123. In the present development, although an aspect of producing the noise removal parameters from only the brightness signal is similar to that of the embodiment mentioned above, but it is characterized in that the noise removal in the frequency region is executed before, thereby to remove the frequency converter portions by one (1). With the embodiment applying the present development therein, it is possible to further reduce the processing volume, the circuit scale and the electric power consumption.

[Embodiment 3]

Figure 10:
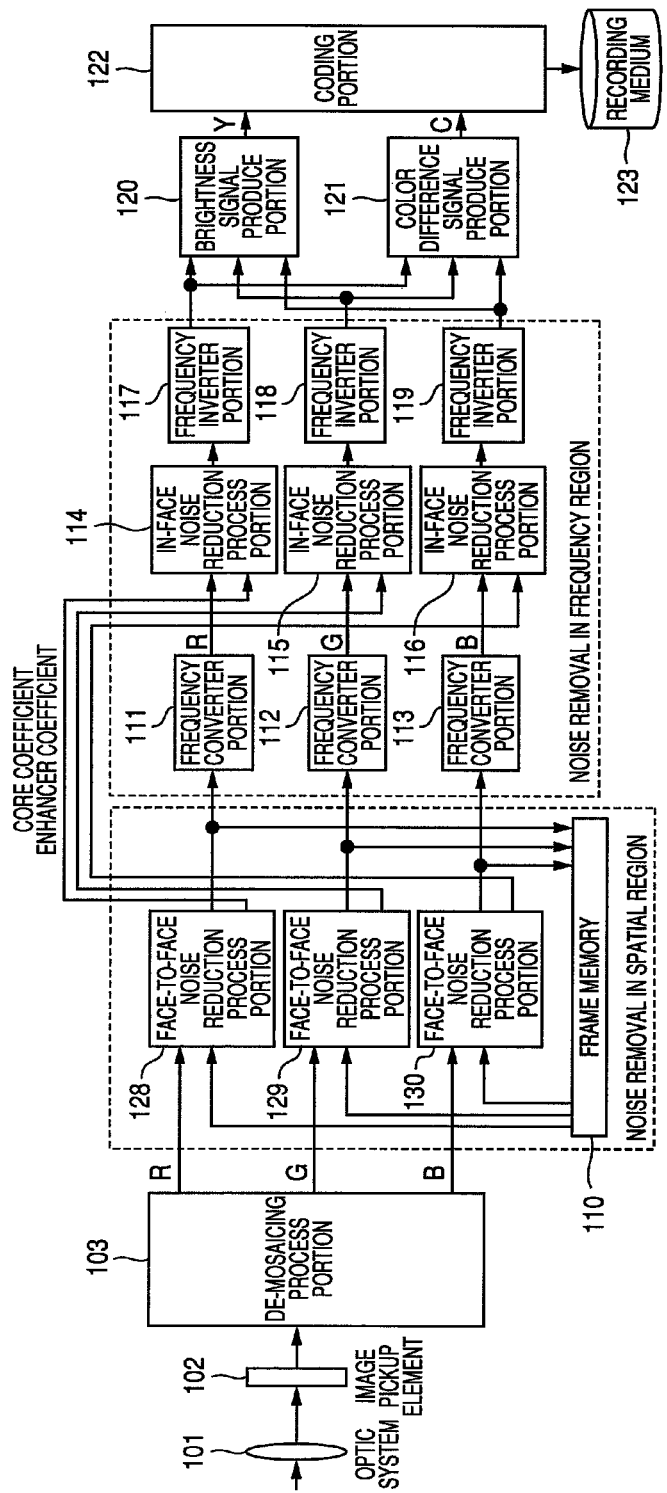
FIG. 10 a block diagram for showing a third embodiment, according to of the present invention.

A third embodiment according to the present invention will be shown in FIG. 10. This FIG. 10 shows the image pickup apparatus, according to the present invention, which is accomplished in the form of the video camera. The video camera, according to the present embodiment, comprises the optic system 101, the image pickup element 102, the de-mosaicing (de-tessellating) process portion 103, face-to-face noise reduction process portions 128-130, the frame memory 110, the frequency converter portions 117-119, the brightness signal generator portion 120, the color difference signal generator portion 121, the coding portion 122 and a recording medium 123. Each constituent element or component shown in FIG. 12, being attached with the same reference numeral to that shown in FIG. 1, operates in the similar manner. Hereinafter, explanation will be given on the operation of the video camera according to the present embodiment, following one by one, sequentially.

Since the third embodiment, according to the present invention, is almost common with the first embodiment mentioned above, then detailed explanation will be only upon the difference between them. Firstly, the video signal, which is taken into by the optic system 101 and the image pickup element 102, is processed within the de-mosaicing process portion 103 to be divided into each of the color component signals, and they are delayed by the frame within the frame memory 110. The respective component signals and the signals, which are obtained by treating the frame delay upon those, are supplied into the face-to-face noise reduction process portions 128 to 130, wherein the random noise removal process is executed depending on the correlation between both the signals. At the same time of this, the noise reduction parameters to be used in the in-face noise reduction process portions 114 to 116 of the later stage are produced depending on the degree of frame correlation, and are outputted. In general, since the portion being high in the frame correlation is the object standing still, and since such position is also sensitive to the noises and looks fine if increasing a feeling of dissolution to be high, then it is preferable to increase the enhancer level while reducing a noise feeling by increasing the core level up to such a degree that no feeling of dissolution is lost. On the contrary, the portion where the frame correlation is low is the portion being moving, and such the portion has the visual characteristics that the sensitivity is low with respect to the noises. Also, strengthening the edges of the portion being moving, too much, comes to be a reason of generation of the noises resulting from the compression, in the coding process of the later stage. At such the portion, it is preferable to control the enhancer level, in suppressive.

The respective color component signals, noises of which are reduced, are converted with the frequencies thereof within the frequency converter portions 111 to 113, and are also supplied to the noise reduction process portions 114 to 116. Since those noise reduction process portions 114 to 116 are similar to those of the first embodiment in the structures and the processing contents thereof, then explanation thereof will be cut off. The respective color component signals, which are treated with the non-linear process (e.g., the coring process and the enhance process) in those noise reduction process portions 114 to 116, are inversely calculated in the frequency inverter portions 117 to 119, and thereby they are converted into signals of the spatial region, again.

The respective color component signals, which are converted again, are supplied into the brightness signal produce portion 120 and the color difference signal produce portion 121, wherein they are converted into the brightness signal and the color difference signal. The brightness signal and the color difference signal are compressed and coded in the coding portion 122, and are also executed a multiplexing process upon a compressed audio signal, which is produced by an audio collector portion, an audio signal pre-process portion and an audio signal coding portion, though not shown in the figure, and a compressed video signal, which is produced within the compression coding process portion mentioned above, thereby to be recorded on the recording medium 123 as compressed video/audio data. With applying the present structure, comparing to the previous embodiment, there can be obtained an effect of reducing a number of the frequency converter portions, and reduction of the processing volume, reduction of the circuit scale, and reduction of electric power consumption, while executing the noise removal for the input signal.

In the present embodiment, the signals to be produced within the de-mosaicing process portion 103 may be the respective color component, such as, R, G and B, or example, and may be the brightness and the color difference, or may be that arranging the respective color components in the Bayer array.

Heretofore, although the explanation was made upon the embodiments according to the present invention; however, the present invention should not be restricted to the embodiments 1 to 3, and may be applied freely, within a region of the present invention.

For example, the embodiments mentioned above were explained in details thereof, for the purpose of explaining the present invention, easily, but necessarily, they should not limited to those having all the structures explained. Also, it is possible to replace a part of the structures of a certain embodiment by that of the structures of other embodiment, and also to add the structure of the other embodiment to the structures of a certain embodiment.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A video recording system, comprising: an image pickup element, which is configured to convert a light into an electric signal; an optic system, which is configured to form an image by condensing the light on said image pickup element; and a signal process unit, which is configured to input the electric signal outputted from said image pickup element, so as to treat a signal process, and thereby to output one or plural numbers of processing result(s), wherein for each of the output(s) of said signal processing unit, The video recording system further having:
    a converter unit, which is configured to treat an orthogonal transformation on an output of said signal processing unit, and thereby produces a frequency conversion signal;
    a delaying unit, which is configured to delay said frequency conversion signal, and thereby to output a frame or field delay signal;
    a correlation produce unit, which is configured to obtain a correlation between said frequency conversion signal and said frame or field delay signal;
    a second delaying unit, which is configured to delay an output of said signal process unit, and thereby to output a second frame or field delay signal;
    a filtering unit, which is configured to conduct a filter process on an output of said signal process unit, with using the second frame or field delay signal;
    a controller unit, which is configured to control processing contents of said filter process with using an output of said correlation produce unit, wherein the filter process is executed on the output of said signal process unit, depending on the correlation between said frequency conversion signal and said frame delay signal.

2. The video recording system, as described in the claim 1, wherein
    said signal process unit is a color signal produce unit, which is configured to produce three (3) color signals, red, green and blue.

3. The video recording system, as described in the claim 1, wherein said signal process unit is a unit, which is configured to produce a brightness signal and a color difference signal.

4. The video recording system, as described in the claim 1, wherein
    said signal process unit makes up the signal by arranging any one of three (3) color signals, red, green and blue, alternately.

5. A video recording system, comprising:
    an image pickup element, which is configured to convert a light into an electric signal;
    an optic system, which is configured to form an image by condensing the light on said image pickup element;
    a signal process unit, which is configured to input the electric signal outputted from said image pickup element, so as to produce a brightness signal and a color difference signal;
    a converter unit, which is configured to treat an orthogonal transformation on said brightness signal, and thereby produce a frequency conversion signal;
    a delaying unit, which is configured to delay said frequency conversion signal, and thereby to output a frame or field delay signal;
    a correlation produce unit, which is configured to obtain a correlation between said frequency conversion signal and said frame or field delay signal;
    a second delay unit, which is configured to delay said brightness signal and said color difference signal, and thereby to output a second frame or field delay signal;
    a filtering unit, which is configured to conduct a filter process on said brightness signal, with using the second frame or field delay signal;
    a controller unit, which is configured to control processing contents of said filter process, with using an output of said correlation produce unit;
    a second filtering unit, which is configured to execute a filter process on said color difference signal, with using said color difference signal and said second frame or field delay signal; and
    a second control unit, which is configured to control processing contents of said second filter process, with using the output of said correlation produce unit, wherein
    the filter process is executed on said brightness signal and said color difference signal, depending on the correlation between said frequency conversion signal and said frame or field delay signal.

* * * * *